Nov. 13, 1956 K. R. RUNDE 2,770,667
ELECTRICAL PROTECTIVE DEVICES
Filed Nov. 13, 1950 2 Sheets-Sheet 1
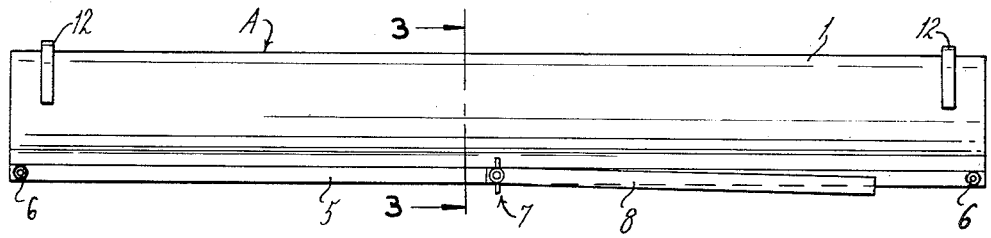
FIG. 1.
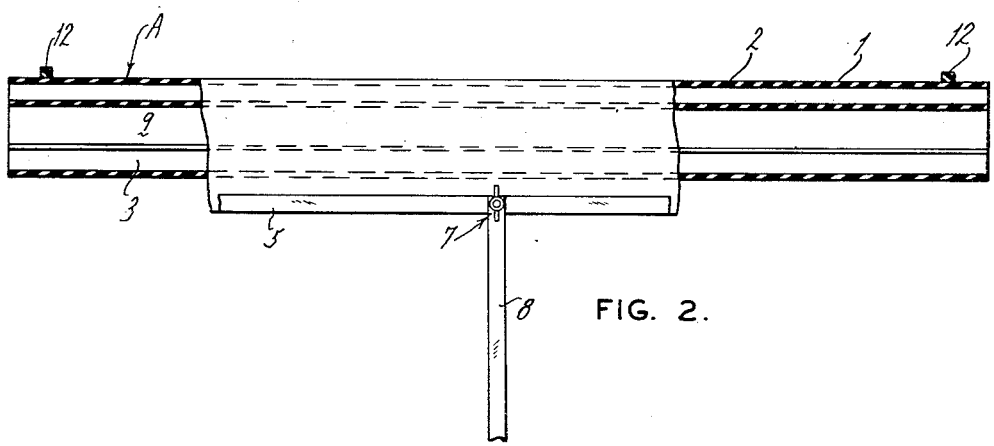
FIG. 2.
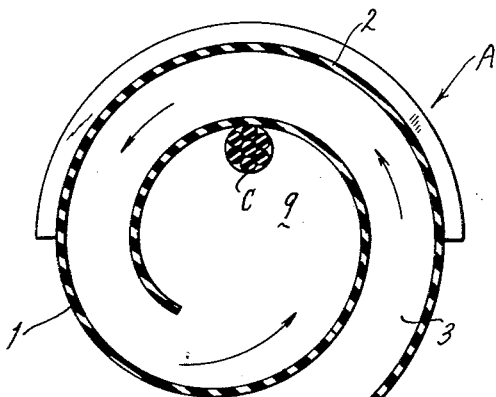
FIG. 3.
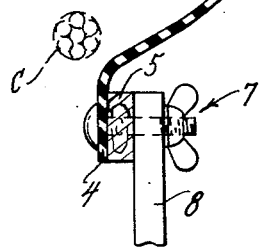
INVENTOR.
KENNETH R. RUNDE
BY
ATTORNEY

INVENTOR.
KENNETH R. RUNDE
BY
ATTORNEY

United States Patent Office 2,770,667
Patented Nov. 13, 1956

2,770,667

ELECTRICAL PROTECTIVE DEVICES

Kenneth R. Runde, Lemay, Mo., assignor to James R. Kearney Corporation, St. Louis, Mo., a corporation of Missouri Application November 13, 1950, Serial No. 195,360

2 Claims. (Cl. 174—5)

This invention relates generally to electrical protective devices and more specifically to protecting devices for protecting linemen at work on poles, and in other situations, from accidental contact with energized electrical lines, the predominant object of the invention being to provide a simple device of this type which is capable of easy and convenient application to an energized electrical line and which when so applied provides for a lineman the maximum protection against injury caused by accidental contact with the energized line.

As is well known to persons familiar with such matters, linemen are required to work high on poles and towers, and in other situations, where they are in close proximity to energized electrical conductors. In such a situation a hazard is produced by the proximity of the energized lines which prevents the linemen from working with their usual freedom of movement and speed, because of the constant fear of receiving shocks or burns as a result of parts of the bodies of the linemen coming into accidental contact with the energized lines. The present invention provides protective means, which may be conveniently applied to portions of the energized lines adjacent to the point at which the linemen are at work, whereby the hazard referred to is entirely eliminated so that the linemen may give their entire attention to the work at hand without the necessity of careful avoidance of contact with the energized lines.

Fig. 1 is a front elevational view of the improved protective device.

Fig. 2 is a longitudinal section taken through the protective device illustrated by Fig. 1.

Fig. 3 is an enlarged cross-section taken on line 3—3 of Fig. 1.

Figure 4:
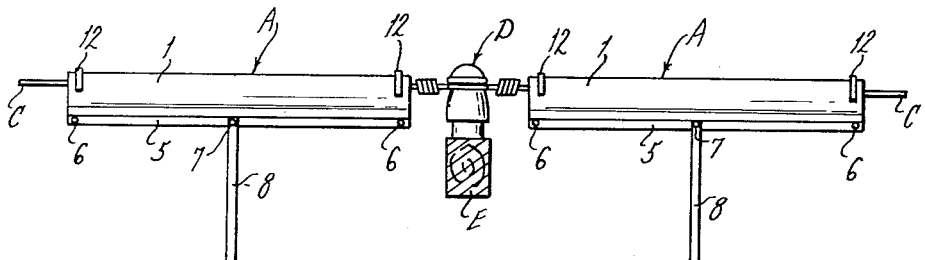
Fig. 4 is a view illustrating a pair of the protective devices applied to an electrical line which is shown as being supported by a cross-arm of a pole (not shown).

In the drawing, wherein is shown for purposes of illustration, merely, one embodiment of the invention, A designates the improved protective device generally. The protective device of this invention is produced from a sheet of plastic, or other suitable material, that is characterized by being a good electrical insulator, said material being shaped to provide an elongated body 1 of scroll-shaped formation in cross-section, as is shown to good advantage in Fig. 3. In other words, the wall 2 of the sheet of material which produces the elongated body 1 is extended in a spiral manner so as to produce within said elongated body a spiral passageway 3 which is defined by spaced portions of said wall 2 of said sheet of material. The elongated body 1 is provided with a flange 4 at the bottom thereof to which a bar 5 is secured by suitable fastening devices 6, said bar having attached thereto by means of a bolt and wing nut assembly 7 a handle 8. By referring to Fig. 3 it will be noted that the spiral passageway 3 within the elongated body 1 is open at the bottom of said elongated body at a point immediately above the flange 4 and that said spiral passageway leads into an inner space 9 which is shaped as is shown in said Fig. 3.

To apply the improved device of this invention to an electrical conductor C the device is moved to the position with respect to the conductor as suggested by broken lines in Fig. 3. The device is then rotated relative to the conductor so as to cause said conductor in effect to travel through the spiral passageway 3, as indicated by the arrows in Fig. 3, the rotation of the device being arrested when the conductor extends through the inner space 9 of the elongated body where it is contacted by a portion of the spiral wall 2 of said elongated body, as in shown by solid lines in Fig. 3. With the device A supported on a conductor as described and as shown in Fig. 3, a lineman is protected against coming into accidental contact with said conductor and being injured thereby, the spaced, insulating, spiral wall 2 of the device and the air in the passageway 3 therebetween affording the protection mentioned.

Figure 5:
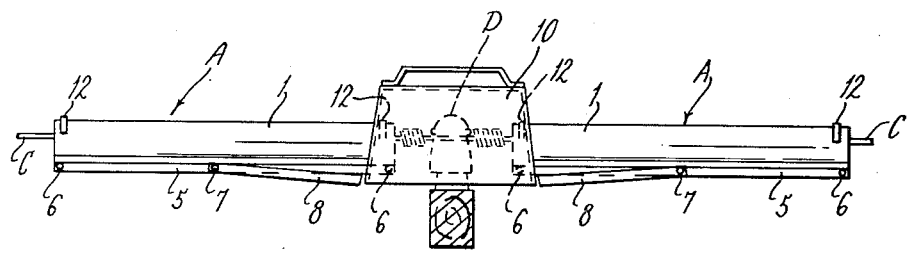
Fig. 5 is a view similar to Fig. 4 but showing a hood associated with the protective devices.
Figure 6:
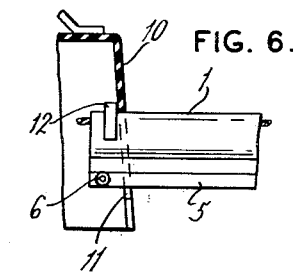
Fig. 6 is a fragmentary vertical section showing the manner in which a protective device is engaged with the hood when in use.

In Fig. 4 a condition is shown where a pair of the improved protective devices are applied to an electrical line at opposite sides of an insulator D of a cross-arm E of a pole (not shown). In some situations, however, it is desirable also to afford protection to linemen with respect to the portion of an electrical line which passes a cross-arm insulator and the tie wires that secure the line to the insulator. The hood 10, shown in Figs. 5 and 6, is provided for this purpose, said hood comprising a housing formed of wood, fiber, or other suitable electrical insulating material which is open at the bottom thereof and has openings 11 formed in the opposed end walls thereof, said openings being open at the bottom edges of said opposed end walls so that the hood may be passed downwardly over the insulator D and with end portions of protective devices located at opposite sides of the insulator extending through the openings 11 formed in the opposed end walls of the hood. In order to lock the protective devices to the hood 10 the elongated body 1 of each protective device A is provided with a pair of semicircular locking collars 12 which are suitably secured thereto, and a locking collar of a protective device engages the inner face portion of an end wall of the hood located above the opening 11 of said end wall as is shown in Fig. 6 so as to connect the protective device and the hood together.

Figure 7:
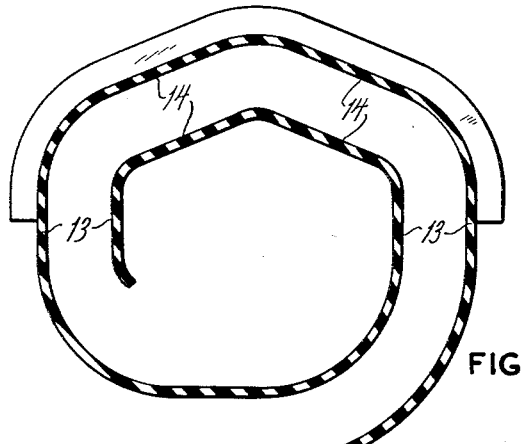
Fig. 7 illustrates a modified form of the invention in cross-section.

Fig. 7 illustrates a modified form of the invention according to which the protective device A is provided with straight side wall portions 13 and straight upper wall portions 14. By so shaping the device its straight wall portions 13 and 14 will contact with straight wall portions of the hood 10 and thus improve the assembly of a protective device with a hood.

I claim:

1. A protective device comprising an elongated body which is formed by a single sheet of relatively rigid electrical insulating material shaped to provide said elongated body with a wall portion extended substantially spirally thereof and spaced apart to provide a substantially spiral passageway having an entrance leading to a central space within said elongated body to admit a conductor from the exterior to said central space, the convolutions of said spiral wall being spaced apart a distance at least equal to the diameter of the conductor, said space within said elongated body having a top wall, portions of which are inclined to provide a seat for a conductor extended through said central space so that said elongated body may be centered in a suspended position with respect to said conductor when in use, and a part on said elongated body for connection with a handle.

2. The protective device of claim 1 wherein said elongated body is provided at an end thereof with means for connecting the same with a housing.

References Cited in the file of this patent

UNITED STATES PATENTS

| | | |
|---|---|---|
| 992,738 | Marshall | May 16, 1911 |
| 1,965,953 | Curtis | July 10, 1934 |
| 1,988,604 | Merrill | Jan. 22, 1935 |
| 2,281,552 | Barrow | May 5, 1942 |
| 2,302,759 | Gibson | Nov. 24, 1942 |
| 2,430,703 | Bowen | Nov. 11, 1947 |

OTHER REFERENCES

"Electric Light and Power," December 1938, page 48. (Copy available in Division 65.)